Sept. 1, 1964   P. W. RAMSEY ETAL   3,147,362
COMPOSITE CONSUMABLE ELECTRODE CONTAINING EMISSIVE
COMPOUNDS AND METHOD OF MANUFACTURE
Filed Aug. 1, 1960

INVENTORS.
PAUL W. RAMSEY
MICHAEL W. ZIMMERMANN
BY
Andrus & Starke
Attorneys

United States Patent Office 3,147,362
Patented Sept. 1, 1964

3,147,362
COMPOSITE CONSUMABLE ELECTRODE CONTAINING EMISSIVE COMPOUNDS AND METHOD OF MANUFACTURE
Paul W. Ramsey, Wauwatosa, and Michael W. Zimmermann, Elm Grove, Wis., assignors to A. O. Smith Corporation, Milwaukee, Wis., a corporation of New York
Filed Aug. 1, 1960, Ser. No. 46,590
10 Claims. (Cl. 219—146)

This invention relates to a composite, consumable electrode for electric arc welding and to the method of making the electrode. More particularly, this invention is directed to a composite metal electrode comprising a plurality of metal strands coated with emissive compounds disposed in a thin metallic sheath and to the method of hot extruding said electrode from a cylindrical shaped metal shell containing relatively small metal particles coated with the emissive compounds.

It has been established that emissive compounds, coated on welding electrodes, tend to eliminate magnetic arc blow and generally promote arc stability. U.S. Patent Numbers 2,694,764, 2,932,722 and 2,932,723 described the advantages to be realized by the use of emissive compounds in welding electrodes. These patents show the emissive materials applied to the outer surface of the electrode as an external coating.

An externally coated electrode presents several major problems. The welding apparatus tends to clog up and stall, and when emissive compounds such as $Rb_2CO_3$ or $Cs_2CO_3$ are sprayed on the surface of a wire electrode, they absorb atmospheric moisture and tend to break down with age. Also, surface films of emissive materials give rise to additional electrical contact problems. It is believed that these problems account for the fact that no externally coated wire has, as yet, received commercial acceptance.

The electrode of this invention solves the above problems by disposing the emissive materials inside a hermetically sealed metal sheath.

The article of the invention is a consumable electrode comprising an outer metallic sheath or casing and containing a plurality of wire strands uniformly coated with emissive materials. The method of making the electrode comprises generally the steps of first coating small segments or scraps of steel with one or more emissive materials and placing the coated steel segments in a relatively larger metal tube. The coated steel pieces are then compacted within the tube to form a homogeneous mass and the tube is then sealed at both ends thereby making a composite billet for extrusion, leaving only a small vent hole for trapped gases. The billet is then pre-heated to a temperature of about 2300° F., and hot extruded and subsequently cold drawn into an electrode wire. The steel scraps are drawn during the extrusion into the form of a bundle or plurality of longitudinal strands with each strand being coated with the emissive materials. By this method, uniform distribution of the emissive materials throughout the inner portion of the electrode is accomplished.

The electrode of the invention is not subject to moisture pickup for the emissive materials are disposed inside the external metal sheath, thereby being effectively sealed against atmospheric moisture, nor is there any electrical contact or machinery clogging problem, because the extruded, composite electrode of this invention has a smooth, outer surface. The composite, multi-strand structure of the central portion of this electrode provides a large number of internal interfaces for uniform distribution of the emissive materials throughout the electrode.

The emissive materials are supplied to the region of the arc at a uniform rate, and due to the emissive capacity of these added materials, the work function voltage is depressed to the point where a desirable spray-type transfer occurs across the arc as compared to a globular metal transfer with considerable spatter. Spatter would otherwise occur, particularly when an A.C. power source is used.

In D.C. straight polarity welding with $CO_2$ shielding gas, the consumable electrode wire serves as the cathode. The emissive materials produce an even, tapered electrode tip burn-off because the emissive materials readily emit electrons, thereby decreasing the work function, and lowering the required voltage across the arc. Less energy is required at the cathode to cause an even, spray-type deposition of the electrode on the workpiece and the arc energy is balanced between the electrode wire and the workpiece.

When an electrode containing emissive materials for welding is used with an A.C. power source, the biggest improvement is noted during the straight polarity portion of the cycle when the electrode is negative. The emissive materials greatly aid in arc reignition at the point when polarity is reversed and the current value passes through zero. The emissive materials lower the work function, thereby lowering the voltage required for arc reignition. The arc reignites easily and smoothly, substantially reducing spatter.

To obtain the maximum benefit from the emissive materials, it is desirable to distribute them as uniformly as possible throughout the welding electrode because the uniform presence of the emissive materials at all points in the arc will produce the optimum effect.

The best mode presently contemplated for carrying out the invention is illustrated in the accompanying drawings in which.

Figure 1:
FIGURE 1 is a plan view with parts broken away showing the composite electrode of this invention.
Figure 2:
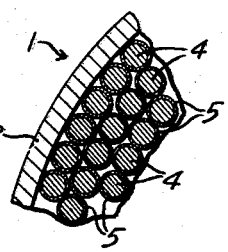
FIG. 2 is a greatly enlarged sectional view of a portion of the electrode shown in FIGURE 1, with the individual strands separated slightly and the coating exaggerated to illustrate the uniform distribution of the emissive materials.
Figure 3:
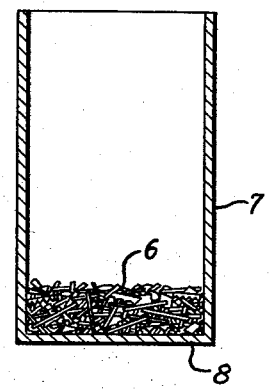
FIG. 3 is a sectional view of a metal tube partially filled with coated metal scraps.

As shown in the drawings, the composite electrode 1 comprises an outer metallic sheath 2 encasing a multi-strand central core 3 formed of a plurality of longitudinal strands 4 each of which is coated with an emissive material 5. The outer metallic sheath 2 is a metal such as unkilled or semi-killed steel, or any suitable steel. The sheath 2 completely encases the multi-strand core 3 and effectively seals the emissive materials 5 in the core 3 from the deleterious effects of atmospheric moisture. The sealing function of the outer metallic sheath 2 is of paramount importance because the emissive compounds are generally hygroscopic, and readily pick up moisture if unprotected from the atmosphere. The emissive materials decompose in the presence of moisture to form hydrates which are ineffectual for welding purposes.

Strands 4 of core 3 are formed of a metal such as an unkilled or semi-killed steel, or any suitable steel and are identifiable as lines only because the tremendous pressure of extrusion, and the subsequent drawing of the electrode eliminates all interstitial cavities in the composite electrode 1. It is important that the metal of sheath 2 be comparable in extrusion properties to the metal selected for the strands 4. If they are different in their flow characteristics, a non-uniform extrusion would result.

Emissive compounds, such as $Rb_2CO_3$, $K_2CO_3$, $Cs_2CO_3$, $Na_2CO_3$, and $Li_2CO_3$, are uniformly coated on the wire strands 4 and serve to help supply electrical conducting particles (electrons and ions) in the plasma between the electrode wire and the workpiece. This is most helpful during A.C. welding at "0" voltage because it facilitates arc reignition. The emissive materials may also be other compounds which emit electrons readily when heated by the arc during welding. These additional materials include compounds of alkali and alkaline earth metals such as the carbonates or nitrates of Ca, Ba and Sr, and rare earth metals such as Ce or Th. Compounds of francium may be used for their emissive properties but this is not generally practical, due to the radioactive properties of francium.

The chemical analysis for a typical mixture of emissive compounds used in the practice of this invention is as follows:

|  | Percent |
|---|---|
| $Rb_2CO_3$ | 45.45 |
| $K_2CO_3$ | 47.17 |
| $Cs_2CO_3$ | .10 |
| $Na_2CO_3$ | 2.17 |
| $Li_2CO_3$ | .86 |

Figure 4:
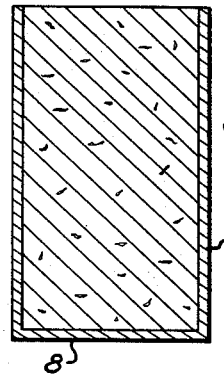
FIG. 4 is a sectional view of the metal tube after compaction of the coated metal scraps.
Figure 5:
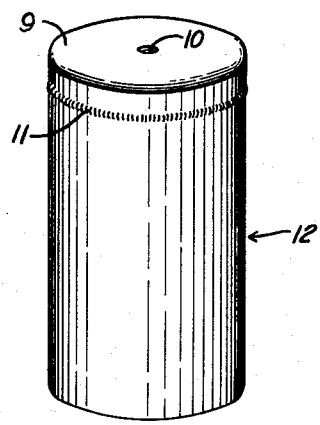
FIG. 5 is a perspective view of a metal tube billet showing a closure cap welded thereto.

In producing the composite electrode 1, the metal scraps 6 or pieces are first dipped in an aqueous solution of nitric acid containing the emissive compounds. The metal scraps 6 are small wire segments, iron filings, metal slugs and range in size from 1–3 inches. The metal scraps 6 are then removed from the bath and dried at temperature generally in range of 750° to 900° F. leaving a coating of emissive materials on each piece. The metal scraps or pieces 6 are then placed into a metal tube 7 having a bottom 8 and compacted to substantially fill the metal tube 7, as shown in FIG. 4. Compaction may be accomplished on a conventional hydraulic press. Pressuure should be developed to the range of 400–450 tons for best densification of the metal scrap 6.

After the metal tube 7 is filled with compacted metal scrap 6, a cover 9 having a relatively small hole 10 in its top surface is fitted over the metal tube 7 and secured thereto by means of weld 11 to form a substantially sealed billet 12 for hot extrusion. The small hole 10 permits ready escape of trapped gases in the billet 12.

Billet 12 is next preheated to a temperature ranging from 2000°–2300° F. to prepare it for hot extrusion. This preheating step may be accomplished by means of an electric or gas-fired furnace in a reducing gas atmosphere, or by immersion in a resistance heated salt bath or by any other conventional heating method.

Figure 6:
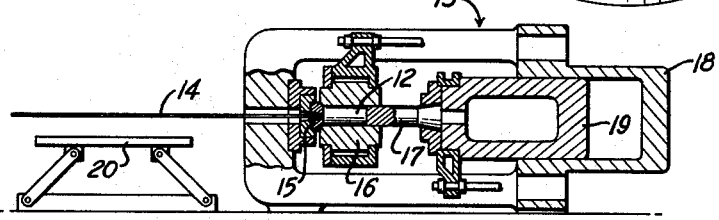
FIG. 6 is a longitudinal section through an extrusion press illustrating schematically the extrusion of the metal tube billet.

After the billet 12 is heated to a temperature in the range of 2000°–2300° F., it is removed from the heating source and loaded in the breech of a horizontal hot extrusion press 13, shown schematically in FIG. 6. The billet 12 is extruded while still hot to form composite rod 14, which is identical in structure to the electrode 1 shown in FIG. 1, except that it is of greater diameter.

Press 13 is a conventional hot extrusion press and develops an extrusion pressure in the range 4,200–6,000 p.s.i. Press 13 comprises an extrusion die 15, a cylinder 16 and a piston or plunger 17 which is shown as being operated hydraulically by a cylinder 18 and a piston 19. By applying hydraulic pressure to the cylinder 18, the piston 19 is moved horizontally and pushes the piston or plunger 17 into the cylinder 16 against the billet 12. Billet 12 is raised to its liquidus temperature by the pressure and extruded through the die 15 to form rod 14. Rod 14 solidifies upon leaving die 15 and contacting the air. A run-out trough 20 is provided to receive the rod 14, which may be extruded almost instantaneously to lengths up to 100 feet.

The hole 10 is limited in size to the minimum required to permit escape of expanding gases during the preheating step of the process described above. The hole 10 is obliterated by the extrusion pressure developed and the inside of the rod 14 is substantially hermetically sealed from the atmosphere.

After hot extrusion the wire can be cold drawn to any desired diameter.

The composite welding electrode of this invention provides a consumable electrode for A.C. electric arc welding which contains emissive materials which stabilize the arc and make possible efficient welding with an A.C. power source and $CO_2$ shielding gas.

An outer sheath provides a hermetically sealed casing which protects the emissive materials contained in the casing from decomposing due to moisture pick up. Also, the smooth metallic surface of the outer sheath provides an excellent electrical contact for the arc welding circuit. By disposing the emissive materials inside the electrode, clogging of the welding head is completely avoided.

Various modes of carrying out the invention are contemplated as being within the scope of the following claims particularly pointing out and distinctly claiming the subject matter which is regarded as the invention.

We claim:

1. A composite metal electrode for electric arc welding comprising, a continuous outer metal sheath, an inner laminar, multi-strand core confined inside said outer metal sheath and substantially sealed thereby to protect said core from the atmosphere, and an electron emissive material uniformly disposed throughout said inner laminar core, said metal sheath and inner laminar core being extruded together from a composite billet comprising a tubular member containing metal scraps coated with emissive materials.

2. A composite metal electrode for electric arc welding comprising, an outer extruded metallic sheath providing a hermetically sealed casing, an extruded inner core disposed within the sheath and composed of a plurality of metallic strands, and an emissive compound coating each of said strands and functioning to provide arc stabilizing electrons and ions during electric arc welding, said emissive compound being selected from the group consisting of the alkali metal carbonates, the alkaline earth metal carbonates, rare earth metal carbonates, the alkali metal nitrates, the alkaline earth metal nitrates, the rare earth metal nitrates, and mixtures thereof.

3. An electrode for $CO_2$ gas shielded, alternating current supply, electric arc welding comprising, an outer steel sheath providing a hermetically sealed casing, an inner laminar core disposed within the sheath and composed of a mass of steel strands, and an electron emitting substance uniformly distributed throughout the mass of said inner core, said emissive compound being selected from the group consisting of the alkali metal carbonates, the alkaline earth metal carbonates, rare earth metal carbonates, the alkali metal nitrates, the alkaline earth metal nitrates, rare earth metal nitrates, and mixtures thereof, said metal sheath and inner laminar core being extruded together from a composite billet comprising a tubular member containing metal scraps coated with emissive materials.

4. A semi-killed steel electrode for $CO_2$ gas shielded, alternating and direct current arc welding comprising an outer, substantially hermetically sealed sheath, an inner, laminar, unidirectional multi-strand steel core, and an electron emitting mixture of $RbCO_3$, $K_2CO_3$, $CsCO_3$ $Na_2CO_3$ and $Li_2CO_3$ distributed throughout said inner core to provide arc stability during welding, said metal sheath and inner laminar core being extruded together from a composite billet comprising a tubular member containing metal scraps coated with emissive materials.

5. A method of fabricating a composite metal electrode comprising, coating metal scraps with an emissive compound, depositing the coated metal scraps in a tubular metal container, compacting said metal scraps in said container into a dense mass substantially filling said container, sealing a cover on said container to form a billet providing a vent hole in said cover for the escape of gases from said billet during extrusion, heating said billet, and thereafter extruding said billet to form a composite, hermetically sealed, electrode having a smooth surfaced outer casing and an inner core comprising a plurality of longitudinal strands coated with said emissive compound.

6. A method of making a steel electrode for electric arc welding comprising, coating short steel wire segments with an electron emissive material selected from the group consisting of the alkali metal carbonates, the alkaline earth metal carbonates, the rare earth metal carbonates, the alkali metal nitrates, the alkaline earth metal nitrates, the rare earth metal nitrites, the rare earth metal nitrates, and mixtures thereof, depositing the coated steel wire segments in a tubular steel container having a bottom, compacting said wire segments into a dense, solid mass using a compaction pressure in the range of 400–450 tons, sealing a cover on said container to form a solid billet, forming a vent opening in said billet for the escape of gases during extrusion, heating said billet to the range of 2000°–2300° F., and extruding said heated billet to form a composite steel electrode having a smooth outer sheath and a hermetically sealed inner core impregnated with the said electron emissive compounds.

7. A method of making a bare metallic electrode for gas shielded electric arc welding with an alternating current power supply comprising, coating metal scraps with a mixture of electron emitting materials comprising $RbCO_3$, $K_2CO_3$, $CsCO_3$, $Na_2CO_3$ and $Li_2CO_3$, placing said metal scraps in a metal tube having one open end, compacting said metal scraps to form a mass of metal scraps completely filling said metal tube, welding a cover over the open end of said tube to completely enclose the mass contained therein, forming a vent in said tube for the escape of gases during extrusion, heating said tube to a temperature just below the liquidus temperature of said tube and compacted mass contained therein, and ram extruding said tube and compacted mass of metal scraps therein contained through a stationary extrusion die at a hydraulic pressure in the range of 4,200 to 6,000 p.s.i. to produce a bare metallic electrode comprising an outer metal sheath and an inner electron emissive coated metal core for gas shielded electric arc welding with an alternating current power supply.

8. A method of fabricating a composite metal electrode comprising, coating short metal wire segments with an electron emissive material selected from the group consisting of the alkali metal carbonates, the alkaline earth metal carbonates, the rare earth metal carbonates, the alkali metal nitrates, the alkaline earth metal nitrates, the rare earth metal nitrates, and mixtures thereof, depositing the coated wire segments in a tubular steel container having a bottom, compacting said wire into a dense, solid mass to substantially eliminate all atmospheric gases mixed therewith, sealing said container to form a solid billet, providing said container with vent means for the escape of gases during extrusion, heating said billet to a temperature range just below its liquidus temperature, extruding said heated billet to form a relatively long rod-like structure comprising an outer metal sheath and an inner core hermetically sealed electron emissive compounds, and subsequently drawing said rod-like structure to a greater length and predetermined lesser diameter to provide a composite metal electrode for electric arc welding.

9. A method of fabricating a composite metal electrode comprising, coating metal scraps with an emissive compound, depositing the coated metal scraps in a tubular metal container, compacting said metal scraps into a dense mass filling said container sealing said container to form a billet, cutting a relatively small hole through the outer container of said billet to provide a vent for escaping gases, heating said billet, and thereafter extruding said billet to form a composite electrode having a smooth surfaced outer metal casing hermetically sealing an inner core comprising a plurality of longitudinal strands coated with said emissive compound.

10. A composite steel electrode for electric arc welding comprising, a plurality of longitudinally extending strands of metal, each strand having a coating of electron emissive material thereon, said strands being intimately disposed in relation to each other with substantially no interstitial cavities therebetween, and a tubular metal sheath intimately surrounding said strands and hermetically sealed to prevent moisture from contacting said strands and emissive materials thereon, said metal strands and tubular metal sheath being formed by the hot extrusion of a tubular steel billet containing compacted metal scraps coated with emissive materials.

References Cited in the file of this patent
UNITED STATES PATENTS

| | | |
|---|---|---|
| 1,995,584 | Sarazin | Mar. 26, 1935 |
| 2,123,416 | Graham | July 12, 1938 |
| 2,137,471 | Zublin | Nov. 22, 1938 |
| 2,493,143 | Ingels | Jan. 3, 1950 |
| 2,500,380 | Rochat | Mar. 14, 1950 |
| 3,036,205 | Aida et al. | May 22, 1962 |

FOREIGN PATENTS

| | | |
|---|---|---|
| 595,892 | Great Britain | Dec. 19, 1947 |